Figure 1:
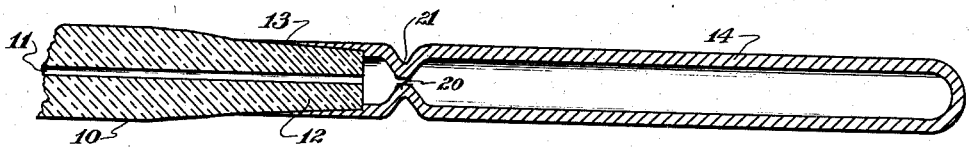

Dec. 23, 1941.  L. EISELE  2,267,556

THERMOMETER

Filed May 4, 1940

LOGAN EISELE
INVENTOR.

BY Robert J. Killman
ATTORNEY.

UNITED STATES PATENT OFFICE 2,267,556

THERMOMETER

Logan Eisele, Nashville, Tenn.

Application May 4, 1940, Serial No. 333,259

1 Claim. (Cl. 73—371)

This invention relates to thermometers and more particularly to mercury-in-glass clinical thermometers.

It has been customary, in the past, to construct clinical thermometers with a glass bulb formed integrally with the glass thermometer stem for containing the bulk of the mercury whose expansion, due to the heat of the object or person whose temperature is being measured, causes a portion thereof to rise into the very small bore of the stem and thus provides the indication of the temperature.

Now in order to produce such expansion of the mercury in this bulb it is necessary that heat flow from the object being measured through the walls of the bulb into the mass of mercury. It is well known that glass is a very poor conductor of heat and it is therefore necessary to leave the thermometer bulb in contact with the object whose temperature is being measured for an appreciable length of time.

It is one of the important objects of my invention to substitute a metal bulb for the usual glass bulb, fastening said metal bulb to the glass stem by means of a tapered joint either with or without the use of suitable cement. The metal bulb may also be fused to the glass stem.

Since metal is an excellent conductor of heat, being from fifty to one hundred times more conductive than glass, my thermometer will require exposure to the heat of the body whose temperature is being measured for a very short period of time, i. e. from one-hundredth to one-fiftieth the time required for the mercury mass of a glass bulb thermometer to reach the temperature of the object whose temperature is being measured.

It has been customary in clinical thermometers made in the past to form a contraction or constriction in the bore of the stem at a point near the juncture of the stem and bulb for the purpose of causing the mercury column to break when the mercury in the bulb contracts or shrinks due to a lowering of its temperature. This feature allows the mercury column to maintain its position relative to the stem calibration so that the reading may be taken after the instrument has been removed from the source of heat whose temperature is being measured.

This contraction has usually been made by softening, by means of heat, a portion of the glass stem and forming a small localized enlargement of the bore. Then by expert manipulation this enlargement is caused to first flatten out, then its walls are caused to collapse until, meeting each other in the center, they form a bridging pillar extending from side to side across the cavity of the bore enlargement thus dividing the passage therethrough into two branches, the cross section area of each branch being small as compared to the bore of the thermometer stem.

The expansion of the mercury in the bulb, due to a rise in temperature easily forces mercury through these small passages into the bore of the stem, but, when the bulb is removed from the source of heat and therefore the mercury mass shrinks or contracts due to cooling, as it loses its heat, to the ambient temperature, these small passages offer enough resistance to the passage of mercury through them so that the force of gravity on the extended mercury column and the force of cohesion of the mercury is unable to cause the mercury column to pass through them and reenter the bulb. The mercury column therefore breaks or separates into two sections at the contraction, one portion remaining in the stem and giving a continuing indication of the temperature to which the instrument was previously subjected, while the other portion tends to return into the bulb.

When it is desired to return the first portion to the bulb, in order that another reading may be taken, it is customary to shake or sling the instrument, centrifugal force being developed sufficient to force the mercury through the constricted passages into the bulb.

In my invention the above described arrangement of bore contraction may be used in connection with my metal bulb or certain other means for accomplishing this same result may be used.

Since the forming of the contraction as above described is a comparatively slow and tedious process requiring an exceedingly high degree of skill on the part of the maker, the cost of thermometers made in this manner is relatively high.

It is among the objects of my invention to provide a construction by the use of which all the results above described shall be secured and which at the same time may be easily and cheaply made and assembled by modern quantity production methods.

I have found by experiment that there is a certain range of sizes of apertures through which mercury cannot be caused to flow by the forces of gravity and cohesion, but which will allow mercury to pass under the influence of a reasonable amount of centrifugal force and momentum due to signaling or shaking.

The exact means by which I accomplish these and other objects will be better understood by reference to the accompanying drawing, in which—

Figure 2:
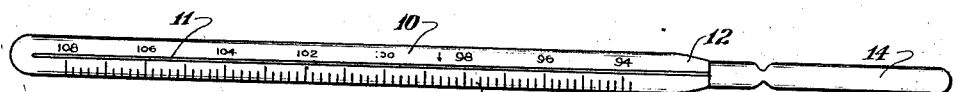

Figure 1 is a sectional view of the form of my invention in which the contraction is made by deforming the walls of the bulb, and Figure 2 is a plan view of a thermometer incorporating my invention.

Referring now in more detail to the drawing the numeral 10 designates the glass stem of the thermometer, commonly of triangular cross section for purposes of optically magnifying the mercury column which is contained in the small bore 11 of the stem 10.

These stems ordinarily vary considerably in size and shape and therefore, in order to provide for uniform attachment of the bulb, to be later described, I subject the end of the stem to a forming and/or grinding process which produces a tapered or conical end portion of circular cross section, 12. In order to prevent localization of strains I prefer to subject this tapered ground portion to the glazing process described in detail in my United States Letters Patent No. 2,090,861 issued Aug. 24, 1937.

Upon this conical or tapered portion 12 of the stem 10 I secure, by means of a complementary, internally tapered portion 13, a bulb of a material of high thermal conductivity such as metal, designated as 14.

The joint between the bulb and the glass stem may depend for permanence and rigidity entirely upon the force with which the cooperating tapered portions are engaged, or I may use suitable glues, adhesives, enamels, cements or the like, either with or without the application of heat, cold etc., or I may, by the application of sufficient heat, cause the glass stem to fuse or weld to the bulb. The stem of the thermometer carries the usual scale calibration 15.

In Figure 1 I show a small internally extending flange 20 in bulb 14. I dent or deform the walls of bulb 14 at a point 21 so that opposite edges of flange 20 come very close together and thus form a small contracted passage.

The operation of the thermometer in the forms shown in Figures 1 and 2 is as follows: The bulb 14 is placed in contact with the object whose temperature it is desired to measure. As the heat is conducted through the walls of bulb 14 the temperature of the mercury contained therein rises and the mercury therefore expands, a portion thereof being forced into the bore 11 of the stem 10 past the contraction, which although offering resistance to the flow cannot prevent it. The upper end of the mercury column in bore 11 will be adjacent one of the calibration marks of the scale carried on stem 10 and will thus indicate the temperature of the source of heat. It is, however, usually inconvenient for the indication to be read while the instrument is in place, usually the oral or rectal cavity of a patient. Therefore the instrument is removed therefrom and the temperature of the mercury begins to fall to the ambient temperature. This causes the mercury to shrink or contract and if it were not for the special action of the contraction in the bore, the upper end of the mercury column would immediately begin to recede and would quickly fall to a point which indicated, not the temperature of the body desired, but the ambient temperature.

However the contraction offers sufficient resistance to the passage of the mercury therethrough that the combined forces of gravity and cohesion of the mercury are unable to force it through and consequently the mercury column breaks or divides at the contraction, the upper part remaining in its proper indicative position until forced down by shaking, slinging or otherwise.

While the invention has been described in language more or less specific as to structural features, it is to be understood that the invention is not to be limited to the specific features shown, but that the means and construction herein disclosed comprise the preferred forms of several modes of putting the invention into effect, and the invention is therefore claimed in any of its forms or modifications within the legitimate and valid scope of the appended claim.

I claim:

A thermometer comprising a stem portion of hard, brittle, transparent material of low thermal conductivity and having a bore therethrough, a mercury containing bulb of tough, malleable material of high heat conductivity joined to said stem portion, a portion of said bulb being dented or deformed at a point adjacent the joint in such manner as to form a restricted passage between said bore and said bulb of such size that the forces of gravity and cohesion are unable to cause mercury to pass therethrough but at the same time large enough that a reasonable amount of shaking or slinging will cause mercury to pass therethrough, said bore and bulb being partially filled with mercury and evacuated.

LOGAN EISELE.